United States Patent [19]

Schmidt

[11] 3,943,092

[45] Mar. 9, 1976

[54] METHOD OF PRODUCING A DRYING FILTER

[75] Inventor: Jorn Marius Schmidt, Nordborg, Denmark

[73] Assignee: Danfoss A/S, Nordborg, Denmark

[22] Filed: Oct. 15, 1974

[21] Appl. No.: 514,887

Related U.S. Application Data

[63] Continuation of Ser. No. 373,017, June 25, 1973, abandoned.

[30] Foreign Application Priority Data

July 3, 1972 Germany............................ 2232533

[52] U.S. Cl............................ 260/37 EP; 264/122
[51] Int. Cl.$^2$......................................... C08L 63/02
[58] Field of Search......... 260/37 EP; 210/496, 502, 210/503, 504, 505, 506; 264/24, 122

[56] References Cited

UNITED STATES PATENTS

| | | | |
|---|---|---|---|
| 2,933,455 | 4/1960 | Doying | 210/502 |
| 3,269,974 | 8/1966 | Childs | 260/37 |
| 3,269,975 | 8/1966 | Lee | 260/37 |
| 3,813,269 | 5/1974 | Molbert | 264/24 |

OTHER PUBLICATIONS

Lee et al., Handbook of Epoxy Resins, McGraw-Hill Book Co., 1967, pp. 20-21.

*Primary Examiner*—Lewis T. Jacobs

[57] ABSTRACT

The method relates to a method for producing a shaped drying filter. Drying agent particles are mixed with an epoxide containing binding agent and the mixture is compressed to form a shaped body at a high temperature. The epoxide resin components react with each other at a particular temperature. In the method hereof the mixing step is performed below that particular temperature and the compressing step is performed above that temperature. The hardening only takes place during the pressing operation and the mixture can thus be stored for as long a time as desired.

5 Claims, No Drawings

METHOD OF PRODUCING A DRYING FILTER

This is a continuation application of abandoned patent application Ser. No. 373,017, filed June 25, 1973.

The invention relates to a method of producing a drying filter, in which method particles of the drying agent, with the addition of an epoxide containing binding agent, are compressed to form a shaped body at a high temperature. In drying devices, especially those used in refrigerating equipment, use is often made of a shaped drying filter body which consists of particles of a drying agent caused to cohere with the aid of binding agents. The drying agent mainly used is silica gel, though other materials, e.g. the molecular seives as they are called, may also be considered for this purpose. A synthetic resin adhesive is generally used as the binding agent.

Of the binding agents used, epoxide containing binding agents possess the excellent qualities of bonding the particles of drying agent together in a very firm manner and of offering considerable resistance to the action of chemical substances. A procedure that has been used in the production of drying filters is that of mixing together in a container predetermined quantities of drying medium particles and of the two components which are necessary for producing the epoxide resin and which are present in liquid form. This mixture is then placed in the press molds. Only small quantities of the mixture can be produced in this method since epoxide resin hardens within a specific period after the components have been mixed together. If any delay occurs, drying filters have reduced mechanical strength are obtained. Furthermore there exists the danger of the mixture hardening in the container so that it then has to be removed mechanically at considerable expense.

A further known practice is that of mixing a readily vaporizable additive with a liquid epoxide resin solution and then carrying out the pressing operation at an elevated temperature at which the additive vaporizes. This procedure is intended to form pores in the binding agent which facilitate passage of the medium to be dried through the binding agent.

It is also known to produce epoxide resin coatings by contacting a heated surface with a powder which contains the interreacting epoxide resin components in dry form, these components being so selected that they react with each other only under the effect of the heat from the surface. If the powder is contained in a fluidized bed, the coating can be formed by immersing the article in this bed. If use is made of a powder that can be electrostatically charged, the surface may also be coated by electrostatic methods. Epoxide resin powders of this kind are commercially available. Examples of their composition are given in U.S. Pat. Nos. 3,269,974 and 3,269,975.

The object of the invention is to provide a method of producing a drying filter, in which method the finished mixture of the particles of drying agent with the binding agent can be worked over a fairly lengthy period.

According to the invention, this object is achieved by mixing the particles of drying agent with a powder which contains epoxide resin components which react with each other only above a limiting temperature, mixing taking place below this temperature, and then carrying out the pressing operation above the limiting temperature.

With this procedure the hardening reaction only begins during the pressing operation. The mixture of particles of drying medium and the binding medium powder can therefore be stored for as long as required. There is no risk of deterioration in the cohesive capacity nor of setting of the material in the mixing container.

A further advantage is achieved if the binding agent consists of discrete powder particles, i.e. if no continuous layer is formed on the particles of drying medium as it would if a liquid starting material were used. Since the powder particles harden in situ during the pressing operation, a good permeable coating of binding agent can be achieved simply by suitably adjusting the quantity of powder used.

A first type of heat curable epoxy resin composition suitable for use in the present invention is, as disclosed in U.S. Pat. No. 3,269,974, a powdered mixture comprising as the epoxy resin component a mixture of i) a solid condensate of epichlorohydrin and bisphenol A, and having an epoxy functionality of at least 1, a molecular weight of from about 10,00 and a softening point in the range of about 60°–140°C., and ii) a solid condensate of epichlorohydrin and a phenolformaldehyde resin containing active OH groups, and having an epoxy functionality of about 3 to 7, a molecular weight of about 500 to 1500 and a softening point in the range of about 30° to 120° C; and as a hardener therefor a solid anhydride or polyanhydride having a melting point above about 50°C.

A second type of heat curable epoxy resin composition suitable for use in this invention is, as disclosed in U.S. Pat. No. 3,269,975, a powdered mixture comprising as the epoxy resin component a solid condensate of epichlorohydrin or glycerol dichlorohydrin with a dihydric phenol such as resorcinol or bisphenol A and having an epoxy functionality of at least 1, a molecular weight of about 860 to 2250 and a softening point in the range of about 65°–130°C., and, as a hardener therefor, a solid condensate of trimellitic anhydride and a dihydric alcohol selected from the group consisting of diethylene to pentaethylene glycol, di- and tripropylene glycol, and $C_5$–$C_8$ alkane diols.

The above described types of epoxy resin composition are curable by heating to moderately elevated temperatures e.g. in the range of about 180°–200°C.

It is particularly advantageous for the powder particles to be electrostatically charged in order to improve their adhesion to the particles of drying medium. The powder particles are then applied firmly to the particles of drying medium during mixing as a result of the electrostatic force of attraction. Although the particles of the powder and those of the drying medium differ very considerably in size, the electrostatic charge results in the powder being very uniformly distributed in the pressing.

A very simple way of doing this consists in mixing the powder and the particles of drying agent together prior to the pressing operation over a period long enough to cause a sufficient amount of powder for the pressing operation to adhere to the particles of drying agent. In the cause of powder particles made of plastics material, the friction occurring during mixing leads to electrostatic charging. This is the case particularly when particles of silica gel are mixed with an epoxide resin powder as sold for use in electrostatic spraying processes.

A binding agent powder having a relatively small particle size of less than 70$\mu$, and preferably of from 4 to 20μ is used. These small powder particles result in sufficiently firm adhesion and at the same time a relatively thin and readily permeable coating of binding agent.

In a preferred embodiment, powder in a quantity of 5 to 8 percent by weight and preferably 6.5 percent by weight is used.

The mixture can be pressed in a mold under high pressure, preferably approximately 20 kg/cm² and at a temperature above 150°C, and preferably approximately 190°C, during a first short period of for example 2 minutes and then hardened over a longer period e.g. 2 hours, while maintaining the temperature.

Example

Silica gel particles of irregular shape and having a mean particle size of approximately 0.5 to 3 mm were mixed in a container with 6.5 percent by weight of an epoxide resin powder, marketed by Messrs. Aagemakers Lakfabrieken, Breda, under the trade name "Teodar D. M." and having a particle size of less than 70μ and mainly of from 4 to 20μ. Mixing was carried out at room temperature with the aid of a screw rotating in the container. The mixing operation was continued until the powder particles had become substantially completely attached to the surface of the silica gel particles. This mixture could be stored for twenty-four hours without its properties changing.

The mixture was then put into pressing molds and heated to approximately 190°C. over a period of five minutes and under a pressure of approximately 20 kg/cm². The mold was then opened and hardening at approximately 190°C. was completed over a period of two hours.

I claim:

1. A method of producing shaped drying filters which comprises forming a mixture consisting essentially of particles of silica gel and from 5 to 8 percent by weight based on the weight of the gel of a heat curable powder epoxy resin composition having a particle size of less than 70 microns and having a cure temperature of at least about 180°C. and selected from the group consisting of:

a. a powdered mixture comprising, as the epoxy resin component, a mixture of i) a solid condensate of epichlorohydrin and bisphenol A, and having an epoxy functionality of at least 1, a molecular weight of from about 900 to 10,000 and a softening point in the range of about 60°–140°C., and ii) a solid condensate of epichlorohydrin and a phenol-formaldehyde resin containing active —OH groups, and having an epoxy functionality of about 3–7, a molecular weight of about 500 to 1500 and a softening point in the range of about 300 to 120°C.; and, as a hardener therefor, a solid anhydride or polyanhydride having a melting point about about 50°C., and b. a powdered mixture comprising, as the epoxy resin component, a solid condensate of epichlorohydrin or glycerol dichlorohydrin with a dihydric phenol such as resorcinol or bisphenol A, and having an epoxy functionality of at least 1, a molecular weight in the range of about 65°–130°C.; and, as a hardener therefor, a solid condensate of trimellitic anhydride and a dihydric alcohol selected from the group consisting of diethylene to pentaethylene glycols, di- and tri-propylene glycol and $C_5$–$C_8$ alkane $2\omega$ diols; the mixture being formed at a first temperature below the cure temperature of the resin, compressing the mixture to form a shaped body, and heating the compressed mixture to said cure temperature to cure the said resin.

2. A process according to claim 1, wherein the powdered epoxy resin particles are given an electrostatic charge effective to cause the particles to adhere to the surface of the silica gel.

3. A process according to claim 2, wherein the electostatic charge is generated on said particles by frictional engagement with the silica gel particles during mixing.

4. A process according to claim 1, wherein the powdered epoxy resin particles have a particle size in the range 4–20 microns.

5. A process according to claim 1, wherein the silica gel is mixed with 65 percent by weight of the powdered epoxy resin composition, based on the weight of the silica gel.

* * * * *